United States Patent
Baumgartner

(10) Patent No.: US 8,899,041 B2
(45) Date of Patent: Dec. 2, 2014

(54) FRESH GAS SUPPLY DEVICE FOR AN INTERNAL COMBUSTION ENGINE

(71) Applicant: KNORR-BREMSE Systeme fuer Nutzfahrzeuge GmbH, Munich (DE)

(72) Inventor: Johann Baumgartner, Moosburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 167 days.

(21) Appl. No.: 13/714,192

(22) Filed: Dec. 13, 2012

(65) Prior Publication Data
US 2013/0104541 A1    May 2, 2013

Related U.S. Application Data

(63) Continuation of application No. PCT/EP2011/059774, filed on Jun. 14, 2011.

(30) Foreign Application Priority Data

Jun. 17, 2010  (DE) .......................... 10 2010 024 060

(51) Int. Cl.
*F02B 33/44* (2006.01)
*F02B 33/00* (2006.01)
(Continued)

(52) U.S. Cl.
CPC ............... *F02B 33/00* (2013.01); *Y02T 10/144* (2013.01); *F02D 9/1055* (2013.01);
(Continued)

(58) Field of Classification Search
CPC ......... F02B 33/00; F02B 37/04; F02M 23/00; F02M 23/03; F02M 23/12; F02M 35/10255; F02D 9/1055; Y02T 10/146; Y02T 10/144

USPC ................ 60/611, 605.1, 600–603, 608, 612; 477/33; 123/559.1, 564, 699, 562
See application file for complete search history.

(56) References Cited

U.S. PATENT DOCUMENTS

| 6,334,436 B1 | 1/2002 | Paffrath et al. |
| 6,957,535 B2 | 10/2005 | Sumser et al. |

(Continued)

FOREIGN PATENT DOCUMENTS

| DE | 199 05 112 A1 | 8/2000 |
| DE | 102 21 014 A1 | 11/2003 |

(Continued)

OTHER PUBLICATIONS

International Search Report dated Aug. 12, 2011 including English-language translation, 6 pages.

(Continued)

*Primary Examiner* — Thai Ba Trieu
*Assistant Examiner* — Jason T Newton
(74) *Attorney, Agent, or Firm* — Crowell & Moring LLP

(57) ABSTRACT

A fresh gas supply device for an internal combustion engine having an exhaust gas turbocharger includes a charge air inlet for letting in compressed charge air from the exhaust gas turbocharger; an outlet connected to the charge air inlet, wherein the connection is closable via at least one backflow flap pivotable about a rotational flap axis; a compressed air inlet for letting compressed air into the outlet; an adjusting unit for adjusting the at least one backflow flap; at least one additional turbocharging unit having an air turbine and a compressor coupled thereto. The air turbine is disposed upstream of the compressed air inlet in the flow direction of the compressed air and compressed air can flow through the air turbine. The compressor is designed to take in and compress additional charge air from the charge air inlet and deliver compressed additional charge air to the outlet.

17 Claims, 5 Drawing Sheets

(51) Int. Cl.
*F02D 9/10* (2006.01)
*F02M 23/00* (2006.01)
*F02B 37/04* (2006.01)
*F02M 23/03* (2006.01)
*F02M 35/10* (2006.01)
*F02M 23/12* (2006.01)

(52) U.S. Cl.
CPC ............... *Y02T 10/146* (2013.01); *F02M 23/00* (2013.01); *F02B 37/04* (2013.01); *F02M 23/03* (2013.01); *F02M 35/10255* (2013.01); *F02M 23/12* (2013.01)
USPC ............... 60/611; 60/605.1; 60/612; 123/562

(56) References Cited

U.S. PATENT DOCUMENTS

| | | | |
|---|---|---|---|
| 7,665,302 | B2 | 2/2010 | Nemeth et al. |
| 7,762,069 | B2 * | 7/2010 | Gerum ............................. 60/611 |
| 2007/0033939 | A1 * | 2/2007 | Wang et al. ..................... 60/612 |
| 2008/0006031 | A1 * | 1/2008 | Schick et al. ................. 60/605.1 |
| 2008/0133110 | A1 * | 6/2008 | Vetrovec ........................ 701/103 |
| 2013/0232972 | A1 * | 9/2013 | Heiermann .................. 60/605.2 |
| 2014/0026538 | A1 * | 1/2014 | Hauser et al. ................. 60/605.1 |
| 2014/0041623 | A1 * | 2/2014 | Beresewicz et al. .......... 123/337 |

FOREIGN PATENT DOCUMENTS

| | | |
|---|---|---|
| DE | 10 2006 008 783 A1 | 9/2006 |
| EP | 1 088 970 A2 | 4/2001 |
| EP | 1 355 052 A1 | 10/2003 |
| GB | 2 129 055 A | 5/1984 |
| WO | WO 2006/089779 A1 | 8/2006 |

OTHER PUBLICATIONS

German Office Action dated Aug. 29, 2011 including partial English-language translation, 12 pages.
International Preliminary Report on Patentability (PCT/IB/338 & PCT/IB/373), including Written Opinion (PCT/ISA/237) dated Jan. 3, 2013 7 pages.

* cited by examiner

FRESH GAS SUPPLY DEVICE FOR AN INTERNAL COMBUSTION ENGINE

CROSS-REFERENCE TO RELATED APPLICATIONS

This application is a continuation of PCT International Application No. PCT/EP/2011/059774, filed Jun. 14, 2011, which claims priority under 35 U.S.C. §119 from German Patent Application No. DE 10 2010 024 060.5, filed Jun. 17, 2010, the entire disclosures of which are herein expressly incorporated by reference.

BACKGROUND AND SUMMARY OF THE INVENTION

The invention relates to a fresh gas supply device for an internal combustion engine having an exhaust gas turbocharger.

To enhance the charging of internal combustion engines, for example diesel engines, with the aim of increasing torque and power output, various types of boosting systems are known. Exhaust gas turbochargers (ATL) are frequently used; utilizing the residual energy in the exhaust gas of the internal combustion engine in an exhaust gas turbine, they drive a directly coupled turbo-compressor with the mechanical energy generated in the turbine, the air stream thus generated being supplied, with overpressure, to the internal combustion engine.

A known disadvantage of these boosting devices is their sluggish response behavior during acceleration processes. The causes are, firstly, the characteristic curve of continuous-flow machines, that is, of the ATL, which generate only very low charge pressures when there is low gas throughput, and therefore at low engine speeds. A second cause is the fact that increased air charging is available as an increased exhaust gas quantity for driving the ATL only after the four working strokes of a four-stroke engine have been executed, that is, after two engine revolutions, whereby speeding-up of the ATL is additionally retarded.

To eliminate this disadvantage, the ATL is frequently combined with a mechanically driven positive-displacement supercharger or with a smaller ATL specifically adapted to the small exhaust gas flows during the start-up phase. Both solutions require considerable constructional outlay and installation space, especially because the units are arranged directly on the engine as a result of the necessary mechanical drive or the coupling to the exhaust gas system.

In vehicles which are equipped with a compressor and a compressed air storage system for operating an air suspension system and/or a compressed air brake system, there is an opportunity to inject stored compressed air into the internal combustion engine in the acceleration phase, whereby high engine torque and an associated high exhaust gas flow are available in a very short time. After a boost build-up time of a few seconds, the ATL can reach a stable high pressure level. By means of an optimized electronic control system it has been possible to impart very satisfactory operational behavior to such devices, which are also referred to as PBSs (Pneumatic Booster Systems).

FIG. 1 shows schematically an internal combustion engine 1, the exhaust gas line 15 of which for exhaust gas 70 is connected to an exhaust gas turbine 4 of an exhaust gas turbocharger 2. The exhaust gas 70 drives the exhaust gas turbine 4 and is discharged as expanded exhaust gas 71 through an exhaust gas outlet 16. The exhaust gas turbine 4 is coupled to a charge air compressor 3 of the exhaust gas turbocharger 2, for example by way of an exhaust gas turbocharger shaft 5. The charge air compressor 3 compresses fresh air 40 from a fresh air inlet 11 in order to generate compressed charge air 41 for increasing an induction pressure of combustion air 60 in an intake pipe 14 for the internal combustion engine 1. A fresh gas supply device 10, which is arranged between the charge air compressor 3, or a charge air cooler 6 connected downstream thereof in the flow direction, and the intake pipe 14, serves to inject compressed air 51 into the intake pipe 14 of the internal combustion engine 1 in a controlled manner. The compressed air 51 is compressed by a high-pressure compressor 7 from additional air 50 supplied through an air inlet 17 and introduced via a feed line into a compressed air container 8, from which the compressed air 51 is made available to the fresh gas supply device 10 via a compressed air line 19.

A conventional fresh gas supply device 10 is represented schematically in FIG. 2. It is connected by a charge air inlet 12 to the charge air cooler 6, by an outlet 13 to the intake pipe 14 and by a compressed air inlet 29 to the compressed air line 19. A backflow flap 24, which can be swiveled about a flap axis of rotation 25 for closing and opening the connection of the charge air inlet 12 to the outlet 13, is located between the charge air inlet 12 and the outlet 13 in an inlet section 100. In a version described by the application document WO 2006/089779 A1 in relation to a device for supplying fresh air to a turbocharged piston internal combustion engine and a method for operating same, the backflow flap 24 is adjusted by an adjusting device 26, for example an adjusting motor. In addition, the compressed air line 19 is connected to the outlet 13 via a quantity regulating device 9, for example a valve. A control unit (not shown) serves to control the quantity regulating device 9 and the adjusting device 26. In the event of a demand for torque in a "kick down" event, the quantity regulating device 9 supplies compressed air 51 to the outlet 13 through the compressed air inlet 29. Prior to this, the backflow flap 24 is closed, so that the compressed air 51 does not flow into the charge air compressor 3 of the exhaust gas turbocharger 2 via the charge air inlet 12 against the intake direction, but into the intake pipe 14 via the outlet 13. When the compressed air supply ends, the backflow flap 24 is opened again and the quantity regulating device 9 is closed. At this time the pressure of the charge air 41 compressed by the charge air compressor 3 of the exhaust gas turbocharger 2 is again sufficient.

In this case it is regarded as disadvantageous that the PBS requires a relatively large storage volume for compressed air, and requires compressed air at a high pressure level of more than 10 bar. That is approximately four to five times the pressure level required for boosting, and required to keep the storage volume acceptable and to achieve a rapid response of the system. For this purpose, a high-pressure piston compressor with relatively high energy consumption is required to generate the necessary compressed air. When the compressed air is injected into the internal combustion engine and expanded to the charge pressure level, the predominant part of the pressure energy generated is diminished by throttling.

It is therefore an object of the present invention to make available an improved fresh gas supply device.

Accordingly, a fresh gas supply device for an internal combustion engine with an exhaust gas turbocharger includes the following: a charge air inlet for admitting compressed charge air from the exhaust gas turbocharger; an outlet connected to the charge air inlet, this connection being closable by way of at least one backflow flap which can be swiveled about a flap axis of rotation; a compressed air inlet for admitting compressed air to the outlet; and an adjusting device for adjusting the at least one backflow flap. The fresh gas supply device also includes at least one additional turbocharging device having a compressed air turbine and a compressor coupled thereto. The compressed air turbine is arranged upstream of the compressed air inlet in the flow direction of the compressed air, and compressed air can flow through the compressed air turbine. The compressor is configured to aspirate and compress additional charge air from the charge air inlet and to convey compressed additional charge air to the outlet.

With the aid of the additional turbocharging device an energy efficiency of the fresh gas supply device is improved in that excess pressure energy of the compressed air supplied is made usable.

The pressure level of the compressed air required to operate the fresh gas supply device does not need to be increased, and the storage volume required for this compressed air can be reduced.

The additional turbocharging device is driven by the injected compressed air and generates an additional charge air stream. The excess energy of the compressed air is thereby made effective and the required quantity of compressed air and the associated storage volume are considerably reduced.

The energy stored in the compressed air is converted in a compressed air turbine of the additional turbocharging device into mechanical work which is transmitted to a compressor via a common shaft. The compressor therefore generates an additional charge air stream which, together with the partly expanded compressed air from an outlet of the compressed air turbine, makes available the desired charge pressure in the intake pipe of the associated internal combustion engine. Because the pressure level of the exhaust gas turbocharger is lower in this phase, a backflow flap is closed in order to prevent reverse flow. The increased filling of the internal combustion engine and the rise in the speed of the internal combustion engine as a result of increased power cause a sharp rise in the exhaust gas flow, so that after only a few seconds the exhaust gas turbocharger reaches a pressure level sufficiently high that the boost build-up effect of the fresh gas supply device is no longer required, and the device can be switched off and the backflow flap opened.

In a preferred embodiment, the additional turbocharging device may be integrated in a housing of the fresh gas supply device. An advantageously space-saving constructional unit is thereby made possible.

The compressed air turbine and the compressor of the at least one additional turbocharging device are coupled by a shaft. This shaft may extend through a housing of the fresh gas supply device or, in an alternative configuration, may be arranged outside the housing.

The shaft may be mounted rotatably in bearings configured as air bearings. Negligible frictional losses thereby occur in the bearings.

It is especially advantageous if one of the bearings of the shaft, in the form of air bearings, is supplied with the compressed air and another with the compressed additional charge air. In this way an additional air supply for the air bearings can be dispensed with.

The fresh gas supply device may further include a quantity regulating device which has a closed position and any desired number of open positions, in which open positions the quantity regulating device supplies compressed air to the compressed air turbine of the additional turbocharging device. In this way, in conjunction with a suitable control device, especially effective utilization of the energy present in the compressed air can be made possible.

It is further provided that the adjusting device for adjusting the at least one backflow flap is configured in such a way that a completely open position of the at least one backflow flap is associated with a completely closed position of the quantity regulating device. It is therefore ensured that no reaction of the injected compressed air on the exhaust gas turbocharger occurs.

An internal combustion engine having at least one exhaust gas turbocharger, at least one compressed air container and at least one high-pressure compressor has the above-described fresh gas supply device.

The use of such a fresh gas supply device is especially important in heavy commercial vehicles.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
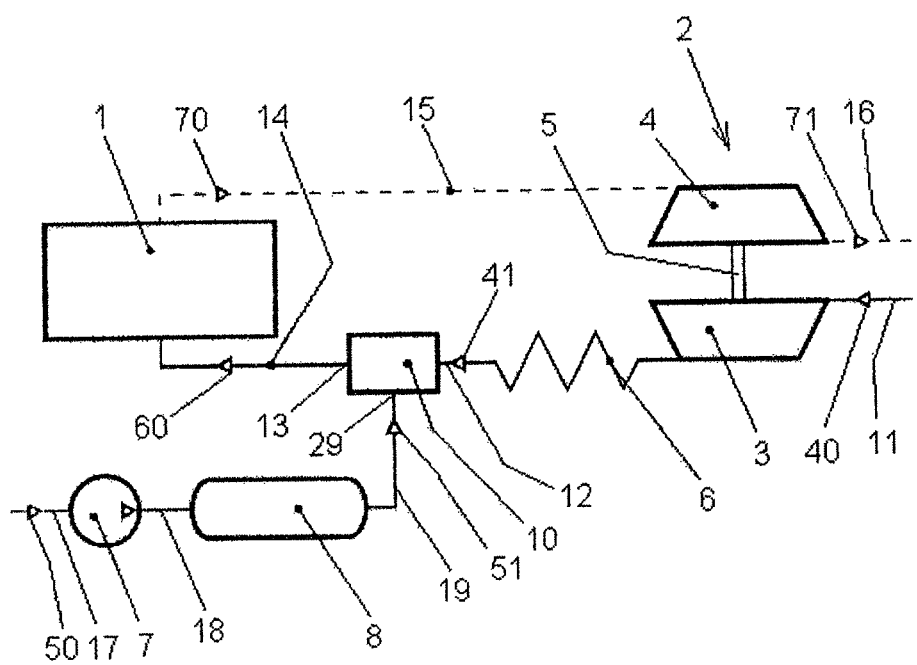
FIG. 1 is a schematic block diagram of an internal combustion engine having an exhaust gas turbocharger and a fresh gas supply device according to the prior art.

Like constructional elements, and functional units having the same function, are characterized in the figures with the same reference numerals.

Figure 2:
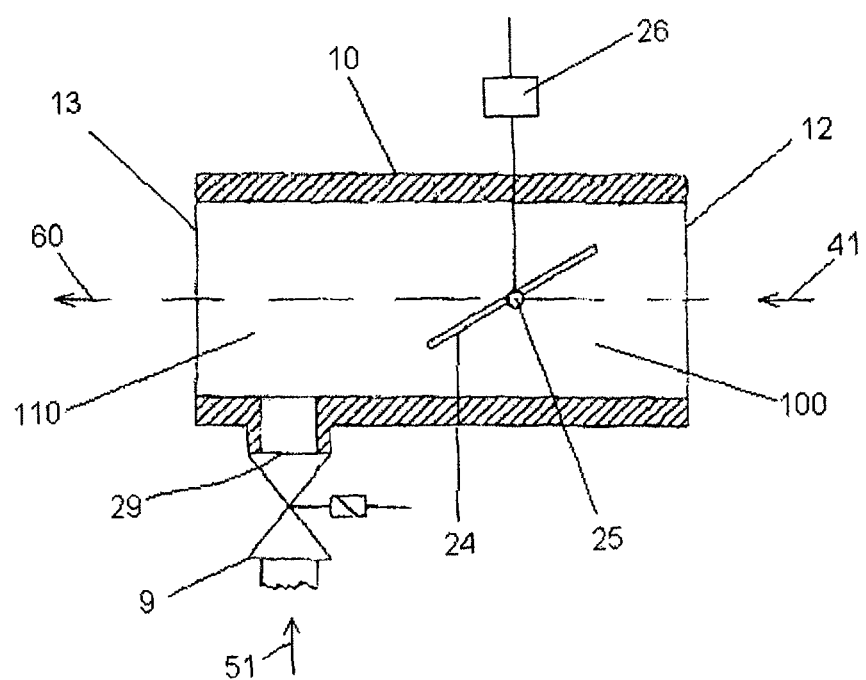
FIG. 2 is a schematic representation of a conventional fresh gas supply device according to the prior art.

FIG. 1 and FIG. 2 have already been described in the introduction.

Figure 3:
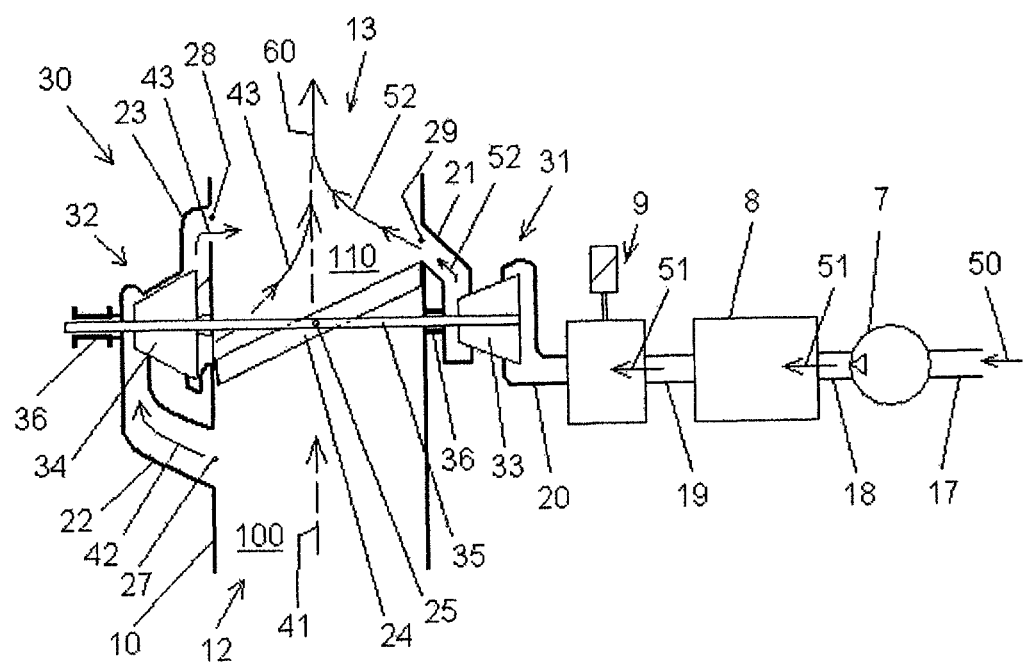
FIG. 3 is a schematic diagram of an exemplary embodiment of a fresh gas supply device according to the invention.

FIG. 3 is a schematic diagram of an exemplary embodiment of a fresh gas supply device 10 according to the invention.

The fresh gas supply device 10 has a substantially cylindrical housing (indicated only schematically) with a charge air inlet 12 (see FIGS. 1, 2), arranged at the bottom in FIG. 3, for compressed charge air 41 from the exhaust gas turbocharger 2, and an outlet 13, arranged at the top in FIG. 3, to an intake pipe 14 (see FIG. 1). An inlet section 100 with a backflow flap 25, which is arranged swivelably about an axis of rotation 25, adjoins the charge air inlet 12. In this example, as already shown in FIG. 2, the backflow flap 24 may be connected to an adjusting device (not shown in detail).

In contrast to the prior art (FIG. 2), the fresh gas supply device 10 according to the invention is provided with an additional turbocharging device 30. This additional turbocharging device 30 includes a drive section 31 with a compressed air turbine 33, a compression section 32 with a compressor 34 and associated housing and air guidance parts. The compressed air turbine 33 is coupled in a rotationally fixed manner by a shaft 35 to the compressor 34, the shaft 35 being mounted rotatably in bearings 36. This additional turbocharging device 30 is also referred to as a "cold" turbocharger. It is integrated in the fresh gas supply device 10; variants are described below.

The drive section 31 is connected by an inlet of the compressed air turbine 33 via a compressed air connection 20 to a quantity regulating device 9. The quantity regulating device 9 has already been described in connection with FIG. 2. Its inlet is connected via the compressed air line 19 to the compressed air container 8 (also see FIG. 1). The generation of the compressed air 51 is as already described in connection with FIG. 1; the description will not be repeated here. The outlet of the compressed air turbine 33 is connected to a compressed air inlet 29 of the fresh gas supply device 10, which inlet 29 is arranged downstream of the backflow flap 24 (on the top right-hand side in FIG. 3) in the flow direction, via a compressed air inlet pipe 21.

The compression section 32 of the additional turbocharging device 30 is arranged on the other side of the fresh gas supply device 10. An inlet of the compressor 34 communicates via an additional charge air intake pipe 22 through an additional charge air branch 27 with the inlet section 100 of the fresh gas supply device 10 upstream of the backflow flap 24 in the flow direction. An outlet of the compressor 34 is connected by an additional charge air pressure pipe 23 via an additional charge air inlet 28 to the outlet section 110 of the fresh gas supply device 10 downstream of the backflow flap 24 in the flow direction.

The compressed air 51 made available from the compressed air container 8 has a relatively high pressure level of, for example, 12 bar. Upon detection, by means of a suitable control device (not shown), of a requirement for increased filling of the internal combustion engine 1 (see FIG. 1), the quantity regulating device 9 is opened and the compressed air 51 flows through the compressed air connection 20 to the inlet of the compressed air turbine 33 of the additional turbocharging device 30. At the same time the backflow flap 24 in the fresh gas supply device 10 is closed in order to avoid a reverse flow of combustion air 60 in the outlet section 110 into the inlet section 100 and to the exhaust gas turbocharger 2 during the pressure build-up which now follows in the outlet section 110 and in the intake pipe 14. This process is shown in FIG. 3.

The compressed air 51 flowing into the compressed air turbine 33 is expanded in the compressed air turbine 33, the pressure energy contained therein being converted first into kinetic energy and then into mechanical work, which is transmitted via the shaft 35, set in rapid rotary motion by the compressed air turbine 33, to the compressor 34 coupled mechanically thereto. The expanded compressed air 52 flowing from the compressed air turbine 33 is conducted through the compressed air inlet pipe 21 and the compressed air inlet 29 into the outlet section 110 and therefore into the intake pipe 14. This expanded compressed air 52 flows out against the pressure being established therein. In the compressor 34, the mechanical work delivered via the shaft 35 is converted back into kinetic energy and finally into pressure energy, which is used to compress additional charge air 42, aspirated additionally through the additional charge air intake pipe 22, into compressed additional charge air 43. The additional charge air 43 compressed in this way flows, like the expanded compressed air 52, through the additional charge air pressure pipe 23 and the additional charge air inlet 28 into the outlet section 110 of the fresh gas supply device 10, downstream of the backflow flap 24 in the flow direction, and therefore into the intake pipe 14, and is conveyed by the compressor 34 against the pressure being established in the intake pipe 14.

In the outlet section 110 of the fresh gas supply device 10, the combustion air 60 supplied to the intake pipe 14 and therefore to the internal combustion engine 1 is formed from the expanded compressed air 52 from the drive section 31, and from the compressed additional charge air 43 from the compression section 32 of the additional turbocharging device 30.

As a result of the increasing filling of the internal combustion engine 1, the torque and speed of the internal combustion engine 1, and therefore its exhaust gas volume, increase progressively, so that after only a few seconds the pressure in the intake pipe 14 and in the outlet section 110, and in the inlet section 100 of the fresh gas supply device 10, is equalized on both sides of the backflow flap 24. The quantity regulating device 9 now interrupts the compressed air supply and the backflow flap 24 is opened.

In this way excess pressure energy of the compressed air 51 is used in the additional turbocharging device 30 to generate an additional charge air stream of compressed charge air 43, whereby the excess energy of the compressed air 51 is made effective, so that the required air quantity, and the storage volume in the high-pressure circuit of the compressed air 51, can be considerably reduced.

Figure 4:
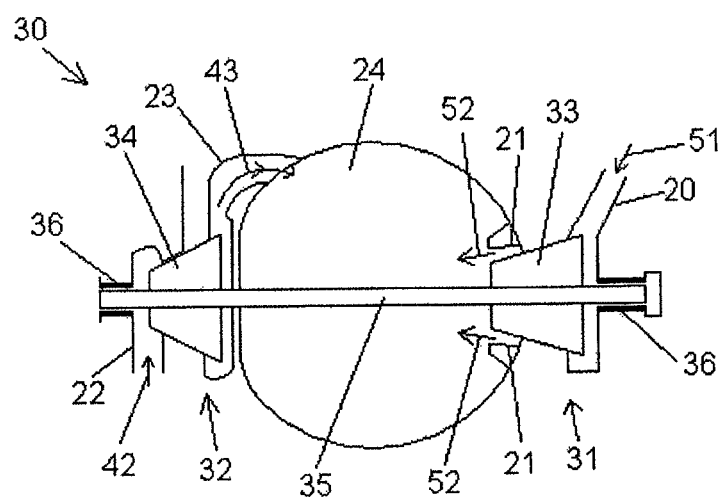
FIG. 4 is a schematic diagram of a first variant of the exemplary embodiment of the fresh gas supply device according to the invention of FIG. 3.

FIG. 4 is a schematic diagram of a first variant of the exemplary embodiment of the fresh gas supply device 10 according to the invention shown in FIG. 3.

In FIG. 4 the additional turbocharging device 30 with the drive section 31, the compression section 32 and the associated air conduits 20, 21, 22, 23, is shown schematically. A view into the outlet section 110 of the fresh gas supply device 10 looking towards the backflow flap 24 is shown, the housing of the fresh gas supply device 10 not being represented.

In this variant, the additional turbocharging device 30 is integrated in the fresh gas supply device 10 downstream of the backflow flap 24 in the flow direction in such a way that the shaft 35 passes centrally through the housing of the fresh gas supply device 10. This arrangement requires the smallest additional installation space, the bearings 36 of the shaft 35 being arranged on the sides of the compressed air turbine 33 and of the compressor 34 oriented away from the housing of the fresh gas supply device 10.

Figure 5:
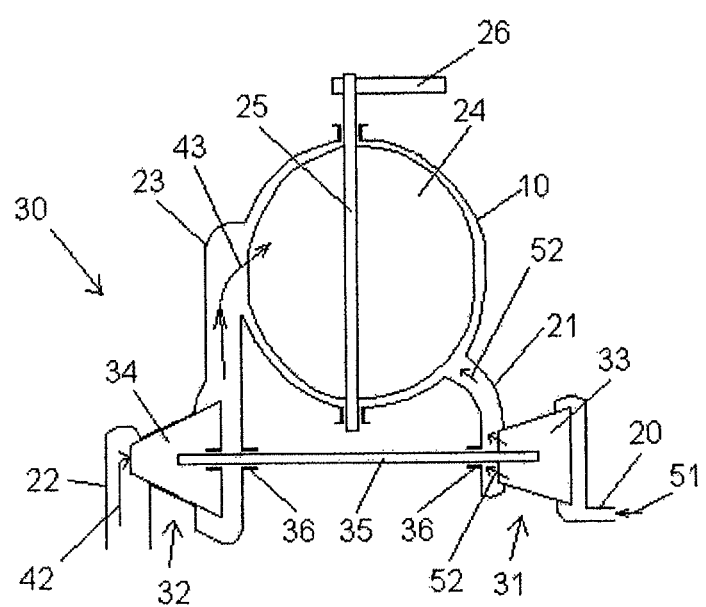
FIG. 5 is a schematic diagram of a second variant of the exemplary embodiment of the fresh gas supply device according to the invention of FIG. 3.

In FIG. 5, the housing of the fresh gas supply device 10 is again indicated schematically, FIG. 5 being a schematic representation of a second variant of the exemplary embodiment of the fresh gas supply device 10 according to the invention shown in FIG. 3.

As in FIG. 4, the view is in the direction of the outlet section 110 and shows the backflow flap 24 from behind, in the flow direction, with the rotary flap spindle 25 mounted in the housing of the fresh gas supply device 10, and the adjusting device 26 (indicated only schematically).

In this second variant an internally located bearing arrangement comprising bearings 36 of the shaft 35 of the additional turbocharging device 30 is made possible, with the shaft 35 arranged parallel and crosswise with respect to the housing of the fresh gas supply device 10. In this case the shaft 35 may be arranged across the housing of the fresh gas supply device 10 at right angles, as shown in FIG. 4. However it may also be located parallel to the longitudinal axis of the housing of the fresh gas supply device 10 (that is, perpendicularly to the plane of projection of FIG. 4), or at any desired crossing angle.

The bearings 36 of the shaft 35 may especially advantageously be in the form of air bearings. This is beneficial since no functionally-determined forces arise transversely to the bearings, since the required compressed air is directly available and, furthermore, pressurized oil lubrication of the bearings 36 is more complex and costly to implement because of the need for a pressurized oil supply and the resulting sealing problems. Thus, it can be clearly seen in FIG. 5 that one bearing 36 of the shaft 35 is arranged in the compressor section 32 in the wall of the additional charge air pressure pipe 23 in such a way that it is supplied from the compressed additional charge air 43. The other bearing 36 of the shaft 35 is located in the wall of the compressed air inlet pipe 21 and is supplied from the expanded compressed air 52.

The benefit obtained with this fresh gas supply device 10 with additional turbocharging device 30 can be measured by the quantity of compressed charge air 43 additionally supplied by the compressor 34 of the additional turbocharging device 30. The required quantity of compressed air 51 from the high-pressure circuit can be reduced by this air quantity while achieving the same effect. An energy saving results from the reduced output required from the high-pressure compressor 7. In addition, the possible reduction in the compressed air storage volume improves the installation conditions and reduces the weight of the associated vehicle.

The invention is not restricted to the above-described exemplary embodiments. For example, it is possible that the shaft 35 in the second variant shown in FIG. 4 can be arranged so as to cross the housing of the fresh gas supply device 10 at right angles. However, it may also be disposed parallel to the longitudinal axis of the housing of the fresh gas supply device 10 (that is, perpendicularly to the plane of projection of FIG. 4), or at any desired crossing angle.

LIST OF REFERENCE NUMERALS

1 Internal combustion engine
2 Exhaust gas turbocharger
3 Charge air compressor
4 Exhaust gas turbine
5 Exhaust gas turbocharger shaft
6 Charge air cooler
7 High-pressure compressor
8 Compressed air container
9 Quantity regulating device
10 Fresh gas supply device
11 Fresh gas inlet
12 Charge air inlet
13 Outlet
14 Intake pipe
15 Exhaust gas line
16 Exhaust gas outlet
17 Air inlet
18 Feed line
19 Compressed air line
20 Compressed air connection
21 Compressed air inlet pipe
22 Additional charge air intake pipe
23 Additional charge air pressure pipe
24 Backflow flap
25 Flap axis of rotation/rotary flap spindle
26 Adjusting device
27 Additional charge air branch
28 Additional charge air inlet
29 Compressed air inlet
30 Additional turbocharging device
31 Drive section
32 Compression section
33 Compressed air turbine
34 Compressor
35 Shaft
36 Bearing
40 Fresh air
41 Compressed charge air
42 Additional charge air
43 Compressed additional charge air
50 Additional air
51 Compressed air
52 Expanded compressed air
60 Combustion air
70 Exhaust gas
71 Expanded exhaust gas
100 Inlet section
110 Outlet section The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fresh gas supply device for an internal combustion engine with an exhaust gas turbocharger, comprising:
   a charge air inlet for admitting compressed charge air from the exhaust gas turbocharger;
   an outlet connected to the charge air inlet, the connection being closable via at least one backflow flap swivelable about a flap axis of rotation;
   a compressed air inlet for admitting compressed air to the outlet;
   an adjusting device for adjusting the at least one backflow flap;
   at least one additional turbocharging device comprising a compressed air turbine and a compressor coupled thereto,
      wherein the compressed air turbine is arranged upstream of the compressed air inlet in the flow direction of the compressed air, wherein compressed air is flowable through the compressed air turbine, and
      wherein the compressor is configured to aspirate and compress additional charge air from the charge air inlet and to convey compressed additional charge air into the outlet.

2. The fresh gas supply device as claimed in claim 1, wherein the additional turbocharging device is integrated in a housing of the fresh gas supply device.

3. The fresh gas supply device as claimed in claim 2, wherein the compressed air turbine and the compressor of the at least one additional turbocharging device are coupled by a shaft, the shaft extending through a housing of the fresh gas supply device.

4. The fresh gas supply device as claimed in claim 1, wherein the compressed air turbine and the compressor of the at least one additional turbocharging device are coupled by a shaft, the shaft extending through a housing of the fresh gas supply device.

5. The fresh gas supply device as claimed in claim 1, wherein the compressed air turbine and the compressor of the at least one additional turbocharging device are coupled by a shaft, the shaft being arranged outside a housing of the fresh gas supply device.

6. The fresh gas supply device as claimed in claim 2, wherein the compressed air turbine and the compressor of the at least one additional turbocharging device are coupled by a shaft, the shaft being arranged outside a housing of the fresh gas supply device.

7. The fresh gas supply device as claimed in claim 3, wherein the shaft is mounted rotatably in air bearings.

8. The fresh gas supply device as claimed in claim 4, wherein the shaft is mounted rotatably in air bearings.

9. The fresh gas supply device as claimed in claim 5, wherein the shaft is mounted rotatably in air bearings.

10. The fresh gas supply device as claimed in claim 6, wherein the shaft is mounted rotatably in air bearings.

11. The fresh gas supply device as claimed in claim 7, wherein one of the air bearings of the shaft is supplied with the compressed air and another with the compressed additional charge air.

12. The fresh gas supply device as claimed in claim 9, wherein one of the air bearings of the shaft is supplied with the compressed air and another with the compressed additional charge air.

13. The fresh gas supply device as claimed in claim 1, further comprising:
a quantity regulating device, which has a closed position and any desired number of open positions, in which open positions the quantity regulating device supplies compressed air to the compressed air turbine of the additional turbocharging device.

14. The fresh gas supply device as claimed in claim 3, further comprising:
a quantity regulating device, which has a closed position and any desired number of open positions, in which open positions the quantity regulating device supplies compressed air to the compressed air turbine of the additional turbocharging device.

15. The fresh gas supply device as claimed in claim 5, further comprising:
a quantity regulating device, which has a closed position and any desired number of open positions, in which open positions the quantity regulating device supplies compressed air to the compressed air turbine of the additional turbocharging device.

16. The fresh gas supply device as claimed in claim 13, wherein the adjusting device for adjusting the at least one backflow flap is operatively configured such that a completely open position of the at least one backflow flap is associated with a completely closed position of the quantity regulating device.

17. An internal combustion engine, comprising:
an exhaust gas turbocharger;
at least one compressed air container;
at least one high-pressure compressor; and
a fresh gas supply device comprising:
a charge air inlet for admitting compressed charge air from the exhaust gas turbocharger;
an outlet connected to the charge air inlet, the connection being closable via at least one backflow flap swivelable about a flap axis of rotation;
a compressed air inlet for admitting compressed air to the outlet;
an adjusting device for adjusting the at least one backflow flap;
at least one additional turbocharging device comprising a compressed air turbine and a compressor coupled thereto,
wherein the compressed air turbine is arranged upstream of the compressed air inlet in the flow direction of the compressed air, wherein compressed air is flowable through the compressed air turbine, and
wherein the compressor is configured to aspirate and compress additional charge air from the charge air inlet and to convey compressed additional charge air into the outlet.

* * * * *